United States Patent
Haehlke et al.

(10) Patent No.: US 12,467,961 B2
(45) Date of Patent: Nov. 11, 2025

(54) METHOD OF DETERMINING A SETTING FOR PERFORMING A SPURIOUS EMISSION MEASUREMENT AND METHOD OF PERFORMING A SPURIOUS EMISSION MEASUREMENT

(71) Applicant: Rohde & Schwarz GmbH & Co. KG, Munich (DE)

(72) Inventors: Benjamin Haehlke, Munich (DE); Pascal Wolff, Munich (DE); Vincent Abadie, Munich (DE); Ralf Zoll, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 80 days.

(21) Appl. No.: 18/192,165

(22) Filed: Mar. 29, 2023

(65) Prior Publication Data

US 2024/0329109 A1   Oct. 3, 2024

(51) Int. Cl.
*G01R 29/08*   (2006.01)
*G01R 29/10*   (2006.01)

(52) U.S. Cl.
CPC ....... *G01R 29/0871* (2013.01); *G01R 29/105* (2013.01)

(58) Field of Classification Search
CPC ................ G01R 29/0871; G01R 29/105
See application file for complete search history.

(56) References Cited

U.S. PATENT DOCUMENTS

| | | | |
|---|---|---|---|
| 10,177,863 B1* | 1/2019 | Koebele | H04B 17/15 |
| 10,554,314 B1* | 2/2020 | Rowell | G01R 29/0821 |
| 2014/0256373 A1* | 9/2014 | Hernandez | H04B 17/12 |
| | | | 455/509 |
| 2018/0262995 A1 | 9/2018 | Akkarakaran et al. | |
| 2019/0052383 A1 | 2/2019 | Olanders et al. | |
| 2019/0229817 A1 | 7/2019 | Axmon et al. | |

* cited by examiner

*Primary Examiner* — Reena Aurora
(74) *Attorney, Agent, or Firm* — CHRISTENSEN O'CONNOR JOHNSON KINDNESS PLLC

(57) ABSTRACT

The present disclosure provides a method of determining a setting for performing a spurious emission measurement of a device under test. A preliminary total radiated power (TRP) measurement of a wanted signal of the device under test is performed along a three-dimensional measurement grid that includes several measurement points. Equivalent isotropic radiated power (EIRP) values are determined for the measurement points during the preliminary total radiated power measurement. The equivalent isotropic radiated power values gathered are evaluated with respect to a threshold value, thereby determining at least one subset of the equivalent isotropic radiated power values. In addition, a method of performing spurious emission measurements is described.

19 Claims, 2 Drawing Sheets

METHOD OF DETERMINING A SETTING FOR PERFORMING A SPURIOUS EMISSION MEASUREMENT AND METHOD OF PERFORMING A SPURIOUS EMISSION MEASUREMENT

FIELD OF THE DISCLOSURE

Embodiments of the present disclosure relate to a method of determining a setting for performing a spurious emission measurement of a device under test. Further, embodiments of the present disclosure relate to a method of performing a spurious emission measurement.

BACKGROUND

In the state of the art, methods of performing a spurious emission measurement of a device under test are known that however are time-consuming.

In general, filters could be required in order to enhance the measurement dynamic at first glance, as it is necessary to filter out a wanted signal of the device under test in order to be enabled to measure possible spurious generated by the device under test.

However, the respective filters have to be set and applied for each of the several measurement points used during the spurious emission measurement, namely all measurement points of a certain measurement grid used for testing, for instance a spherical measurement grid. In fact, band-pass filters may be used for filtering the wanted signal, which however requires that the filter usually has to be tuned to frequency area to be measured. The settling time of filter is time consuming.

In case a total radiated power (TRP) metric is desired, e.g. when the spurious emission measurement is done along a three-dimensional spherical measurement grid, it is very time-consuming to set and apply the filter for all measurement points of the three-dimensional measurement grid in an appropriate manner. In fact, the spurious measurement has to be repeated for each measurement point of the three-dimensional measurement grid in a wide frequency range.

SUMMARY

Accordingly, there is a need for a possibility to reduce the measurement time required for performing a spurious emission measurement.

Embodiments of the present disclosure provide a method of determining a setting for performing a spurious emission measurement of a device under test. In an embodiment, the method comprises the steps of:

Performing a preliminary total radiated power (TRP) measurement of a wanted signal of the device under test along a three-dimensional measurement grid that comprises several measurement points, wherein equivalent isotropic radiated power (EIRP) values are determined for the measurement points during the preliminary total radiated power measurement, and Evaluating the equivalent isotropic radiated power values gathered with respect to a threshold value, thereby determining at least one subset of the equivalent isotropic radiated power values.

The main idea is to categorize the measurement points associated with the three-dimensional measurement grid based on the threshold value in order to identify at least one respective subset of all measurement points associated with three-dimensional measurement grid. In other words, the radiation pattern of the device under test is divided into at least two subsets due to the threshold value applied, namely a first subset and a second subset. The first subset has measurement points associated with equivalent isotropic radiated power values lower than and/or equal the threshold value. The second subset has measurement points associated with equivalent isotropic radiated power values equal and/or higher than the threshold value.

The measurement points associated with the at least one subset may be subjected to a high power emission of the device under test, namely the wanted signal. Then, it can be determined that signals received at those measurement points during a subsequent spurious emission measurement have to be filtered, as the (wanted) signal radiated by the device under test into the respective direction associated with these measurement points are not low enough. In other words, the (wanted) signal radiated by the device under test has an impact on the spurious to be measured during the spurious emission measurement.

For instance, measurement points associated with a beam peak of the radiation pattern of the device under test, namely the wanted signal radiated by the device under test, are associated with high equivalent isotropic power values. Therefore, it will be necessary to apply a filter during the spurious emission measurement of these measurement points in order to reduce or even prevent any influence of the wanted signal. However, other measurement points along the measurement grid are not associated with the beam peak of the radiation pattern of the device under test. Accordingly, it is not necessary to apply a filter for these measurement points, as the equivalent isotropic power values associated with those measurement points are low enough.

In some embodiments, the method of determining a setting for performing a spurious emission measurement provides a setting, as it is determined for which of the measurement points of the measurement grid a filter needs to be applied during the subsequent spurious emission measurement.

Due to the determined setting, the measurement time required for performing the spurious emission measurement can be reduced dramatically, as the measurement points that are associated with low equivalent isotropic power values can be measured without applying a filter. Accordingly, the overall time can be reduced since it is not necessary to set and apply the filter for all measurement points of the measurement grid, but only for those that are associated with high equivalent isotropic power values, for example higher than the threshold value. Hence, time can be saved since the filter is only used if it is necessary.

In other words, each equivalent isotropic power value, when evaluated, provides information if the wanted signal of the device under test is low enough to be not filtered. When evaluating all equivalent isotropic power values, the radiation pattern of the device under test can be determined, enabling to determine for which measurement points of the measurement grid a filter is needed or not.

In general, the wanted signal of the device under test may relate to an uplink signal of the device under test.

An aspect provides that the three-dimensional measurement grid corresponds, for example, to a three-dimensional measurement grid used during a subsequent spurious emission measurement. Therefore, the same measurement points are taken into consideration during the preliminary total radiated power measurement, which are used later for performing the spurious emission measurement.

Another aspect provides that the threshold value is, for example, at least 50% of the maximum equivalent isotropic radiated power value determined during the preliminary total radiated power measurement. The collection of measurement points associated with the three-dimensional measurement grid is split into two groups, namely the two subsets. As indicated above, it has turned out that it is not necessary to apply a filter for the spurious emission measurement in case the equivalent isotropic radiated power value associated with a respective measurement point is lower than the threshold value. The threshold value might be equal to 50% of the maximum equivalent isotropic radiated power value determined, e.g. the maximum value measured. Typically, this maximum value is measured at the peak beam of the radiation pattern.

Depending on the radiation pattern, the threshold value may be lower, e.g. in case of a large peak beam width, or higher, e.g. in case of a narrow peak beam width.

According to an embodiment, the at least one subset comprises measurement points, the equivalent isotropic radiated power values of which are equal or higher than the threshold value. Therefore, the at least one subset mentioned only comprises those measurement points of the measurement grid for which a filter has to be set and applied during the subsequent spurious emission measurement. In other words, the at least one subset comprises measurement points at which it is expected that the wanted signal would disturb the spurious emission measurement. In order to avoid this disturbance, the filter has to be applied during the subsequent spurious emission measurement.

In other words, the subset comprises the measurement points associated with equivalent isotropic radiated power values equal or above the threshold value such that the wanted signal radiated by the device under test has an impact on the spurious emission measurement in case no filter is applied. Hence, the filter is applied in order to ensure proper spurious emission measurement.

In some embodiments, the setting for performing the spurious emission measurement may define that the measurement points of the at least one subset are measured during the spurious emission measurement by using a filter. Generally, the setting is applied when performing the spurious emission measurement. Accordingly, the setting generally defines how the respective spurious emission measurements at the individual measurement points are to be performed, e.g. by applying a filter or not. For the respective measurement points of the at least one subset, the filter has to be applied during the subsequent spurious emission measurement.

Another aspect provides that the at least one subset comprises, for example, measurement points, the equivalent isotropic radiated power values of which are equal or lower than the threshold value. Accordingly, the at least one subset comprises those measurement points that can be measured during the subsequent spurious emission measurement without applying a filter, as it was evaluated that the equivalent isotropic radiated power (EIRP) values are low enough. Accordingly, a measurement time reduction can be achieved as no filter has to be set and applied for these measurement points.

In some embodiments, the setting for performing the spurious emission measurement defines that the measurement points of the at least one subset are measured during the spurious emission measurement without using a filter. As described above, the setting generally defines how the respective spurious emission measurements at the individual measurement points are to be performed, e.g. by applying a filter or not. In case the measurement points of the subset relate to measurement points that are not affected by the wanted signal of the device under test during the spurious emission measurement, it is not necessary to set and apply the filter for the measurements performed at those measurement points.

In some embodiments, the device under test may be located on a three-dimensional positioner. The three-dimensional positioner ensures that the device under test can be moved. A measurement antenna may be located at a fixed position. Hence, a relative movement of the device under test with respect to the measurement antenna is ensured, thereby creating the measurement points along the three-dimensional measurement grid, e.g. a sphere.

In some embodiments, the device under test is moved by the three-dimensional positioner during the preliminary total radiated power measurement. The relative movement of the device under test with respect to the (fixed) measurement antenna ensures that the several measurement points along the measurement grid can be reached appropriately.

According to a further aspect, the preliminary total radiated power measurement is performed, for example, within an anechoic chamber that encompasses the device under test. Any influence or disturbing signals from the environment can be shielded appropriately, thereby ensuring appropriate measurements. The measurement antenna may also be located within the anechoic chamber or at least associated therewith. This means that signals radiated by the device under test located within the anechoic chamber can be received by the measurement antenna.

Moreover, a link antenna may be provided in some embodiments that interacts with the device under test. The link antenna can be used to maintain a signaling connection between the device under test and the link antenna, thereby ensuring that the preliminary total radiated power measurement can be performed while the device under test communicates.

Generally, the device under test may be a radiation-emitting device, for instance a mobile phone, a tablet, a radar system or similar. In some embodiments, the device under test can be a user equipment (UE).

Embodiments of the present disclosure further provide a method of performing spurious emission measurements along a three-dimensional measurement grid encompassing several measurement points. The spurious emission measurements are performed based on a setting determined by the method described above. The determined setting comprises a first subset of measurement points and a second subset of measurement points. The spurious emission measurements are performed at the measurement points of the first subset without using a filter, whereas the spurious emission measurements are performed at the measurement points of the second subset by using a filter.

As discussed above, the method of determining a setting for performing a spurious emission measurement ensures that all measurement points associated with the three-dimensional measurement grid are separated into at least two different groups, namely two different subsets.

The first subset corresponds to measurement points for which the spurious emission measurements can be performed without using a filter, whereas the measurement points of the second subset relate to measurement points where a filter has to be set and applied when performing the spurious emission measurements. Put differently, the measurement points associated with the first subset relate to measurement points where the wanted signal does not influence the spurious emission measurement, e.g. due to low signal strength, whereas the measurement points of the second subset relate to measurement points where the wanted signal of the device under test would have a significant influence on the spurious emission measurement. For this reason, the filter has to be set and applied for the measurement points of the second subset in order to ensure that the spurious emission measurements can be performed for those measurement points.

The main idea is to reduce the overall efforts associated with setting and applying the filter(s), as the number of measurement points that require setting and applying a filter are reduced significantly due to the fact that the collection of measurement points associated with the measurement grid are divided into two subsets, namely measurement points at which it is required to set and apply the filter as well as measurement points at which it is not required to set and apply the filter.

For instance, the spurious emission measurements are performed for an in-band signal. In other words, the wanted signal is an in-band signal, whereas any spurious relate to frequencies out of the wanted signal, namely out of the frequency band associated with the wanted signal. Accordingly, the spurious emission measurements can also be called out-of-band measurements.

Generally, the three-dimensional measurement grid used for the spurious emission measurements may be the same as a three-dimensional measurement grid used for the preliminary total radiated power measurement, e.g. the measurement used for determining the setting applied for the spurious emission measurements. Therefore, it is ensured that the same conditions and boundaries apply when determining the setting as well as performing the spurious emission measurements later.

In general, the filter may be a tunable band-pass filter. The frequency band selected by the filter can be tuned appropriately.

In general, the measurement points of the second subset may correspond to 1% to 15% of the overall measurement points of the three-dimensional measurement grid. Therefore, the time required for setting and applying the filter(s) is reduced significantly.

In other words, the setting provided by the method of determining a setting for performing a spurious emission measurement of a device under test defines at least two different subsets of measurement points, namely the first subset comprising 85% to 99% of all measurement points and the second subset comprising 1% to 15% of all measurement points. The setting further defines that no filter has to be set and/or applied for the majority of the measurement points, namely the ones of the first subset.

In some embodiments, the device under test may be located on a three-dimensional positioner. A measurement antenna may be stationary such that the three-dimensional positioner ensures a relative movement of the device under test with respect to the measurement antenna.

In general, the three-dimensional positioner may be used for ensuring the measurement along the three-dimensional measurement grid, e.g. a sphere.

In some embodiments, the device under test is moved by the three-dimensional positioner during the spurious emission measurement. This ensures that all measurement points of the three-dimensional measurement grid can be reached.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
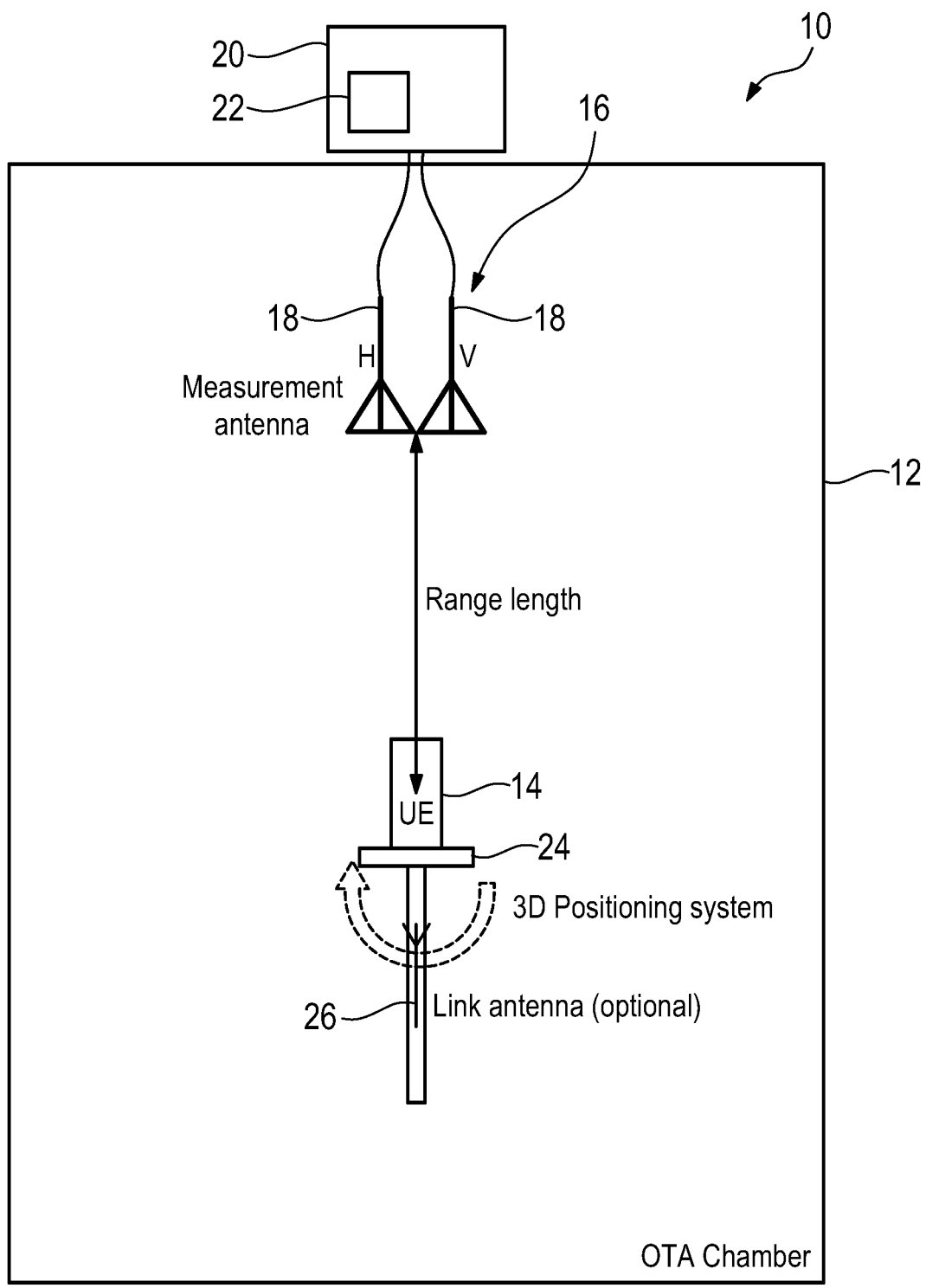
FIG. 1 schematically shows an overview of a setup used for performing the method of determining a setting for performing a spurious emission measurement according to an embodiment of the present disclosure and/or a method of performing spurious emission measurements according to an embodiment of the present disclosure.

FIG. 1 illustrates an example of a system 10 suitable for use in determining a setting for performing a spurious emission measurement. The same system 10, for example, can also be used for performing a spurious emission measurements.

In the shown embodiment, the system 10 comprises an anechoic chamber 12 that is also called over-the-air (OTA) chamber. The anechoic chamber 12 encompasses a device under test 14, for instance a user equipment. Generally, the device under test 14 may be a radiation-emitting device, for instance a mobile phone, a tablet, a radar system, etc.

The system 10 further comprises at least one measurement antenna 16 that is located within the anechoic chamber 12. Alternatively, the at least one measurement antenna 16 is associated with the anechoic chamber 12 such that signals emitted by the device under test 14 located within the anechoic chamber 12 can be received by the measurement antenna 16.

In the shown embodiment, the measurement antenna 16 comprises two antenna elements 18, namely a horizontally polarized antenna element H as well as a vertically polarized antenna element V. Thus, the measurement antenna 16 is a dual-polarized measurement antenna.

The system 10 also comprises a measurement and/or analyzing circuit 20, e.g. encompassed in a measurement and/or analyzing device, which is connected to the measurement antenna 16. Generally, the measurement and/or analyzing circuit 20 is configured to process measurement signals received via the measurement antenna 16. The measurement and/or analyzing circuit 20 comprises, for example, a filter 22 that is used for processing the measurement signals received by the measurement antenna 16.

The system 10 further comprises a three-dimensional positioner 24 that defines a test location for the device under test 14. In some embodiments, the device under test 14 is placed on the three-dimensional positioner 24 such that the device under test 14 can be moved with respect to the measurement antenna 16. In some embodiments, the three-dimensional positioner 24 may include any arrangement of motorized or non-motorized angular or linear drives, rotation tables, X-Y, Y-Z, X-Z or X-Y-Z tables, etc., in order to carry out its functionality. When motorized, the three-dimensional positioner 24 may receive suitable control signals for actuating movement of the device under test 14. Accordingly, a three-dimensional measurement grid having several measurement points can be used during the measurement(s).

In the shown embodiment, the system 10 further comprises an optional link antenna 26 that is generally enabled to communicate with the device under test 14, thereby ensuring that a communication link is maintained during the measurements.

In some embodiments, the measurement antenna 16 is only used to measure the radiation pattern of the device under test 14, namely without communicating with the device under test 14. In other words, the respective communication link is established between the device under test 14 and the optional link antenna 26.

Generally, the system 10 is enabled to perform a method of determining a setting for performing a spurious emission measurement of the device under test 14, an example of which will be described in more detail below.

In a first step S1, a preliminary total radiated power (TRP) measurement of a wanted signal of the device under test 14 along the three-dimensional measurement grid is performed. Hence, several measurement points on the three-dimensional measurement grid are taken into consideration when performing the preliminary total radiated power measurement.

For these measurement points, equivalent isotropic radiated power (EIRP) values are determined. Therefore, the equivalent power of the device under test 14, namely its radiation pattern, can be determined during the preliminary total radiated power measurement in order to identify measurement points on the three-dimensional measurement grid that are subjected to high power values or low power values. Typically, high power values are associated with a beam peak or a main lobe of the radiation pattern of the device under test 14.

Figure 3:
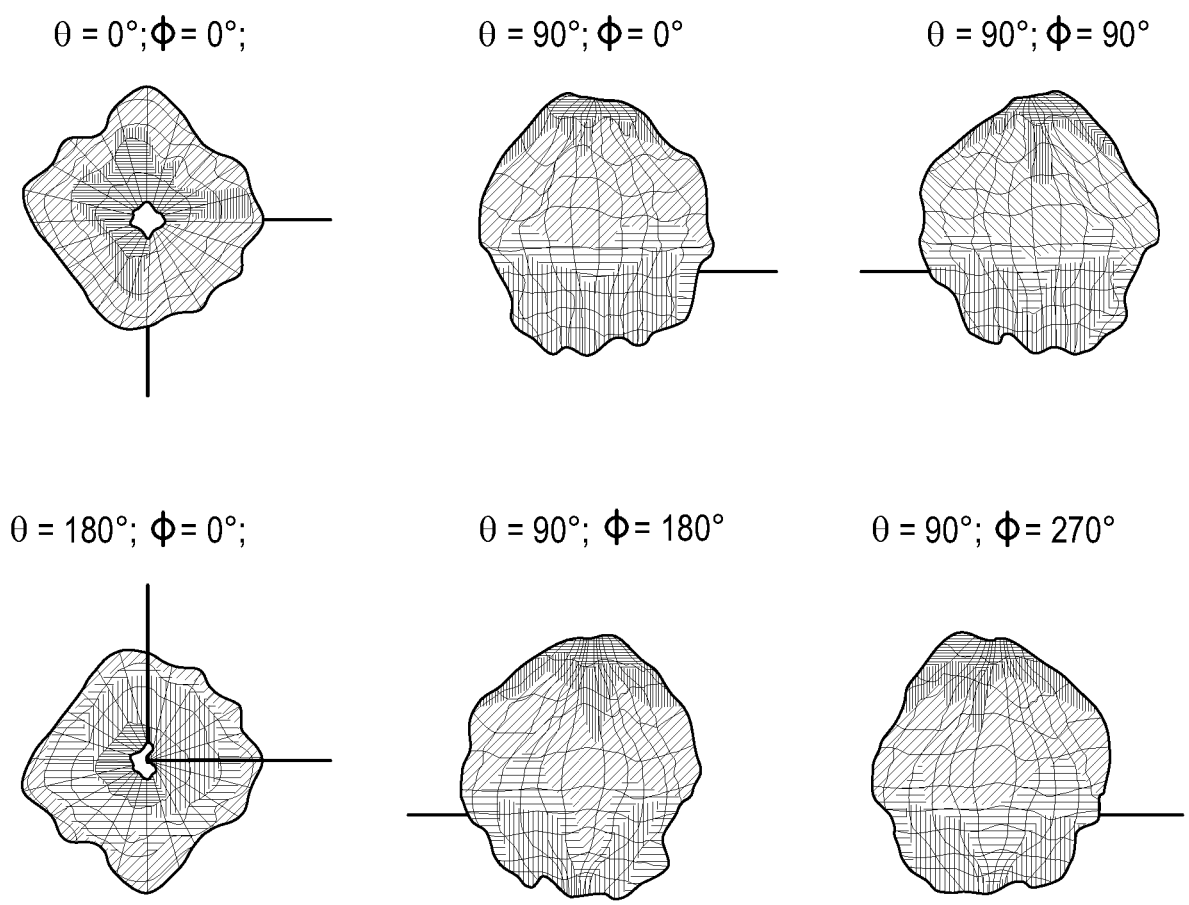
FIG. 3 schematically shows an example of the outcome of the method of determining a setting for performing a spurious emission measurement.

In FIG. 3, the radiation pattern of the device under test 14, for example a radiation pattern defined by the equivalent isotropic radiated power values, is shown for different orientations as indicated in the respective diagrams. These diagrams illustrate deviations of the equivalent isotropic radiated power values among each other. The peak beam or the main lobe of the radiation pattern is shown in the upper left diagram, namely at theta and phi equals 0°.

However, the diagrams shown in FIG. 3 clearly illustrate that the equivalent isotropic radiated power values differ in their respective values. Accordingly, the measurement points of the measurement grid can be categorized based on their isotropic radiated power values.

In a second step S2, the equivalent isotropic radiated power values gathered are evaluated with respect to a threshold value. In other words, the equivalent isotropic radiated power values obtained for the different measurement points along the three-dimensional measurement grid are evaluated in order to identify those measurement points that are associated with an equivalent isotropic radiated power value below or above a certain threshold value.

Accordingly, at least one subset of the measurement points is determined, namely based on determining at least one subset of equivalent isotropic radiated power values.

The at least one subset may be associated with the equivalent isotropic radiated power values that are equal or below the threshold value. Alternatively, the at least one subset is associated with equivalent isotropic radiated power values equal or higher than the threshold value.

However, all measurement points may be separated into two subsets due to the evaluation of the associated equivalent isotropic radiated power values with respect to the threshold value.

Hence, a first subset as well as a second subset may be determined when evaluating the equivalent isotropic radiated power values with respect to the threshold value.

The first subset may be associated with those measurement points, the equivalent isotropic radiated power of which being lower than the threshold value, whereas the second subset comprises measurement points, the equivalent isotropic radiated power values of which are equal or higher than the threshold value.

When referring to FIG. 3, the equivalent isotropic radiated power values of the measurement points associated with the peak beam are typically equal or higher than the threshold value such that they belong to the second subset.

For distinguishing between the two subsets, e.g., defining the threshold value, the maximum equivalent isotropic radiated power value determined during the preliminary total radiated power measurement may be taken into account. For instance, the threshold value may be at least 50% of the maximum equivalent isotropic radiated power value determined. Hence, all measurement points associated with an equivalent isotropic radiated power value higher than 50% of the maximum equivalent isotropic radiated power value determined relate to the second subset, whereas the remaining ones relate to the first subset. The respective threshold value however depends on the application scenario and radiation pattern characteristics, e.g., beam width of the main lobe.

In any case, the determined setting ensures that the first subset comprises measurement points, the equivalent isotropic radiated power values of which are equal or lower than the threshold value, whereas the second subset comprises measurement points, the equivalent isotropic radiated power values of which are equal or higher than the threshold value.

Generally, categorizing all measurement points of the measurement grid into the at least two different subsets ensures that a setting for performing the spurious emission measurements of the device under test 14 is obtained. Accordingly, the evaluation of the equivalent isotropic radiated power values provides a setting that can be used for subsequent spurious emission measurements of the device under test 14.

The spurious emission measurements may be performed for an in-band signal. Hence, the spurious to be identified relate to out-of-band signals, namely signals having a frequency out of the wanted frequency band.

Figure 2:
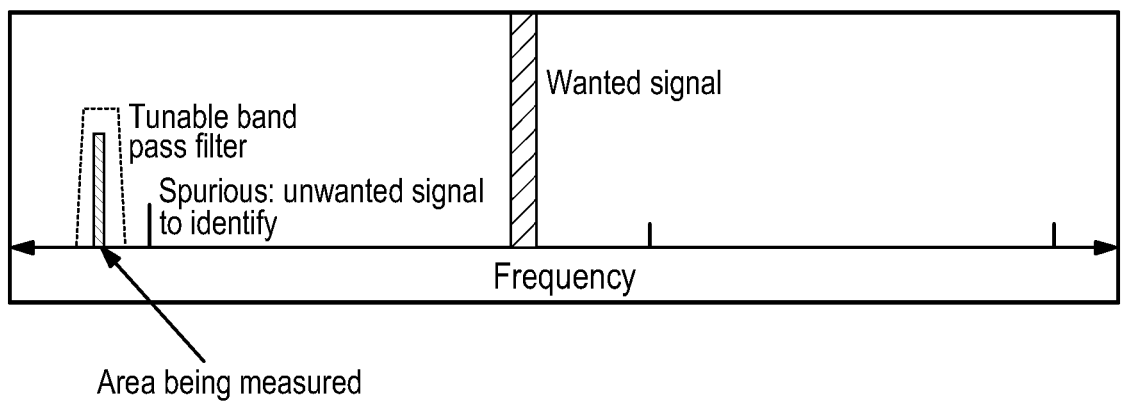
FIG. 2 is a schematic overview illustrating the concept of setting and applying a filter according to an embodiment of the present disclosure.

When performing the spurious emission measurements, it might be necessary to set and apply the filter 22 as illustrated in FIG. 2 schematically in order to ensure that the wanted signal does not disturb the measurements of any spurious emission, namely an unwanted signals that shall be identified.

The filter 22 may be a tunable band-pass filter that is set accordingly, which depends on the setting determined by the method described above.

Accordingly, the setting determined also provides information whether it is necessary to set and apply the filter 22 for the respective measurement points or not.

In some embodiments, it is desirable to set and apply the filter 22 for the measurement points associated with the second subset in order to ensure that the spurious emissions of the device under test 14 can be identified. In other words, the filter 22 is set accordingly for the measurement points of the second subset such that the wanted signal of the device under test 14 does not influence the spurious emission measurements.

In contrast thereto, it is not necessary to set and apply the filter 22 for the measurement points associated with the first subset, as it has been determined during the evaluation that the equivalent isotropic radiated power values at the measurement points associated with the first subset are low enough. Hence, the wanted signal of the device under test 14 does not disturb the spurious emission measurements at the measurement points associated with the first subset.

In other words, the measurement points associated with the first subset, namely the measurement points having equivalent isotropic radiated power values below or equal the threshold value, can be measured with regard to the spurious emissions without using the filter 22. Therefore, it is not necessary to set and apply the filter setting for the filter 22 during the measurement of those measurement points associated with the first subset. Consequently, the time required for performing the overall spurious emission measurement can be reduced significantly.

Generally, the three-dimensional measurement grid that is used during the preliminary total radiated power measurement, which is used for determining the setting to be applied later for the spurious emission measurements, corresponds to the measurement grid that is applied when performing the spurious emission measurements of the device under test 14 subsequently.

The measurement points of the respective measurement grid may be obtained by moving the device under test 14 with respect to the measurement antenna 16. The measurement antenna 16 may be stationary, whereas the device under test 14 is moved by the three-dimensional positioner 24 such that the three-dimensional measurement grid is obtained, e.g., a sphere.

The respective movement may take place during the method of determining the setting for performing a spurious emission measurement of the device under test 14 and/or during the method of performing spurious emission measurements, e.g., based on the setting determined previously.

In any case, the measurement time for spurious emission measurements can be reduced significantly, as the filter 22 has to be set only for a minority of all measurement points along the three-dimensional measurement grid, namely all measurement points of the second subset. The minority may correspond to 1% to 15% of all measurement points of the three-dimensional measurement grid.

Therefore, the time required for setting and applying the filters at the different measurement points of the three-dimensional measurement grid can be reduced to 1% to 15% compared to techniques known in the state of the art, thereby increasing the efficiency significantly.

Certain embodiments disclosed herein include components that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be used synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein with respect to the measurement and/or analyzing circuit 20 can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

In some embodiments, one or more computer-readable media contains computer readable instructions embodied thereon that, when executed by one or more computer circuits, sometimes referred to as computing devices, cause the one or more computer circuits to perform one or more steps of any of the methods disclosed above or claimed below.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C." for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of determining a setting for performing a spurious emission measurement of a device under test, the method comprising the steps of:
    performing a preliminary total radiated power (TRP) measurement of a wanted signal of the device under test along a three-dimensional measurement grid that comprises several measurement points, wherein said performing a preliminary total radiated power (TRP) measurement includes relative movement of the device under test with respect to a measurement antenna so that measurements are taken at the several measurement points,
    determining wherein equivalent isotropic radiated power (EIRP) values are determined for the several measurement points along the three-dimensional measurement grid during the preliminary total radiated power measurement, and
    evaluating the equivalent isotropic radiated power values gathered with respect to a threshold value, thereby determining at least one subset of the equivalent isotropic radiated power values.

2. The method of claim 1, wherein the three-dimensional measurement grid corresponds to a three-dimensional measurement grid used during a subsequent spurious emission measurement.

3. The method of claim 1, wherein the threshold value is at least 50% of the maximum equivalent isotropic radiated power value determined during the preliminary total radiated power measurement.

4. The method of claim 1, wherein the at least one subset comprises measurement points, the equivalent isotropic radiated power values of which are equal or higher than the threshold value.

5. The method of claim 4, wherein the setting for performing the spurious emission measurement defines that the measurement points of the at least one subset are measured during the spurious emission measurement by using a filter.

6. The method of claim 1, wherein the at least one subset comprises measurement points, the equivalent isotropic radiated power values of which are equal or lower than the threshold value.

7. The method of claim 6, wherein the setting for performing the spurious emission measurement defines that the measurement points of the at least one subset are measured during the spurious emission measurement without using a filter.

8. The method of claim 1, wherein the device under test is located on a three-dimensional positioner.

9. The method of claim 8, wherein the device under test is moved by the three-dimensional positioner during the preliminary total radiated power measurement.

10. The method of claim 1, wherein the preliminary total radiated power measurement is performed within an anechoic chamber that encompasses the device under test.

11. The method of claim 1, wherein a link antenna is provided that interacts with the device under test.

12. The method of claim 1, wherein the device under test is a radiation emitting device.

13. A method of performing spurious emission measurements along a three-dimensional measurement grid encompassing several measurement points, wherein the spurious emission measurements are performed based on a setting determined by the method of claim 1, wherein the determined setting comprises a first subset of measurement points and a second subset of measurement points, and wherein the spurious emission measurements are performed at the measurement points of the first subset without using a filter, whereas the spurious emission measurements are performed at the measurement points of the second subset by using a filter.

14. The method of claim 13, wherein the spurious emission measurements are performed for an in-band signal.

15. The method of claim 13, wherein the three-dimensional measurement grid used for the spurious emission measurements is the same as the three-dimensional measurement grid used for the preliminary total radiated power (TRP) measurement.

16. The method of claim 13, wherein the filter is a tunable band-pass filter.

17. The method of claim 13, wherein the measurement points of the second subset correspond to 1% to 15% of all measurement points of the three-dimensional measurement grid.

18. The method of claim 13, wherein the device under test is located on a three-dimensional positioner.

19. The method of claim 18, wherein the device under test is moved by the three-dimensional positioner during the spurious emission measurement.

* * * * *